United States Patent [19]
De Backer et al.

[11] Patent Number: 5,471,113
[45] Date of Patent: Nov. 28, 1995

[54] LOW-PRESSURE MERCURY DISCHARGE LAMP

[75] Inventors: Josephus W. M. De Backer; Cornelia M. J. De Bie, both of Roosendaal, Netherlands

[73] Assignee: U.S. Philips Corporation, New York, N.Y.

[21] Appl. No.: 125,383

[22] Filed: Sep. 22, 1993

[30] Foreign Application Priority Data

Sep. 23, 1992 [EP] European Pat. Off. ............. 92202915

[51] Int. Cl.$^6$ ...................................................... H01J 1/62
[52] U.S. Cl. ...................... 313/487; 313/485; 313/572; 313/577; 313/635; 252/301.4 R; 252/301.4 P; 428/90
[58] Field of Search ..................................... 313/485, 486, 313/487, 572, 577, 635; 252/301.4 R, 301.4 P; 428/690

[56] References Cited

U.S. PATENT DOCUMENTS

| | | | |
|---|---|---|---|
| 3,937,998 | 2/1976 | Verstegen et al. | 313/487 |
| 4,176,294 | 11/1979 | Thornton, Jr. | 313/485 |
| 4,319,161 | 3/1982 | Looye et al. | 313/486 |
| 4,751,426 | 6/1988 | Hoffman et al. | 313/488 X |
| 4,810,930 | 3/1989 | Verlijsdonk et al. | 313/486 |
| 4,827,187 | 5/1989 | Verlijsdonk et al. | 313/486 |
| 5,105,121 | 4/1992 | Sigai et al. | 313/486 |
| 5,122,710 | 6/1992 | Northrop et al. | 313/485 X |

FOREIGN PATENT DOCUMENTS

| | | |
|---|---|---|
| 0057026 | 8/1982 | European Pat. Off. . |
| 0114441 | 12/1983 | European Pat. Off. . |
| 0124175 | 4/1984 | European Pat. Off. . |

OTHER PUBLICATIONS

Applied Physics Letters, vol. 11, No. 2, Jul. 15, 1967, pp. 53–54, Entitled: "A New Phosphor For Flying–Spot Cathode–Ray Tubes For Color Television: Yellow–Emitting Y3A15012–Ce3+".

Publication CIE No. 15, (E–1.3.1) 1971.

Publication CIE No. 13.2 (TC=3.2) 1974.

Rennilson, "Color Temperature: A Problem of Standards", Optical Spectra, Oct. 1980, pp. 63–66.

Primary Examiner—Sandra L. O'Shea
Assistant Examiner—Matthew J. Esserman
Attorney, Agent, or Firm—Brian Wieghaus

[57] ABSTRACT

A low-pressure mercury discharge lamp with a very good color rendering and with a color point $(x_L, y_L)$ on or close to the Planckian locus, includes a gastight, radiation-transmitting envelope which contains mercury and rare gas, and a luminescent layer including a first luminescent material activated by bivalent europium and having an emission band whose maximum lies between 470 nm and 500 nm and whose half-value width is at most 90 nm, a second luminescent material activated by bivalent manganese and having at least an emission band mainly in the red region of the visible spectrum, a third luminescent material with a band emission whose maximum lies between 430 nm and 490 nm, a fourth luminescent material with emission mainly between 520 nm and 565 nm, and a fifth luminescent material with emission mainly between 590 nm and 630 nm.

As compared to a lamp with only the first and second luminescent materials, the addition of the third through fifth materials considerably increases the luminous efficacy of the lamp while the very good color rendering is maintained, and the speed with which the luminescent layer is degraded during lamp life is considerably reduced.

21 Claims, 1 Drawing Sheet

LOW-PRESSURE MERCURY DISCHARGE LAMP

BACKGROUND OF THE INVENTION

The invention relates to a low-pressure mercury discharge lamp with a very good colour rendering and with a colour point $(x_L, y_L)$ on or close to the Planckian locus, provided with a gastight, radiation-transmitting envelope which contains mercury and rare gas, and provided with a luminescent layer comprising a first luminescent material activated by bivalent europium and having an emission band whose maximum lies between 470 nm and 500 nm and whose half-value width is at most 90 nm, a second luminescent material activated by bivalent manganese and having at least an emission band mainly in the red region of the visible spectrum.

The expression "a very good colour rendering" in the present description and claims is understood to mean that the average colour rendering index R(a,8) (average of the colour rendering indices of eight test colours as defined by the International Commission on Illumination: CIE Publication No. 13.2 (TC-3.2), 1974) has a value of at least 90.

The colour of visible radiation is characterized by the colour coordinates (x,y) which determine the colour point in the chromaticity diagram (see CIE Publication No. 15 (E-1.3.1), 1971). A low-pressure mercury discharge lamp, also referred to as lamp hereinafter, for general lighting purposes should emit light which can be designated as "white". White radiation is found in the colour triangle for colour points situated on the Planckian locus. This curve, also called the blackbody line and referred to hereinafter as curve P, contains the colour points of the radiation emitted by a perfectly black body at different temperatures (the so-called colour temperature). A certain colour temperature is assigned, not only to a given point on curve P, but also to radiation having colour coordinates situated on a line intersecting the curve P in said point (see the cited CIE Publication No. 15). If this radiation has a colour point close to the curve P, this radiation is also regarded as white light having this given colour temperature. In the present description and claims, "a colour point close to the curve P" is understood to mean that the distance from the colour point to the point on the curve P having the same colour temperature is at most 20 MPCD. MPCD ("minimum perceptible colour difference") is the unit of colour difference, see the publication by J. J. Rennilson in Optical Spectra, October 1980, p. 63. Apart from requirements to be imposed on the luminescent layer in view of properties regarding the colour temperature of the light radiated by the lamp and the colour rendering, it is also required that the luminescent layer comprises substances which upon excitation by the ultraviolet radiation generated in a low-pressure mercury discharge yield a high luminous flux and maintain this high luminous flux throughout lamp life.

Low-pressure mercury discharge lamps radiating white light and having a very good colour rendering are known from European Patents EP-A-0114441 and EP-A-0124175. It is necessary in these lamps for the luminescent layer to comprise in addition a calcium halophosphate activated by antimony or by antimony and manganese in order to obtain the desired lamp properties. It is found in practice that the requirements as to the colour of the light radiated by the lamp and the colour rendering can only be realised in the known lamp in combination with a comparatively low luminous efficacy of the low-pressure mercury discharge lamp. This is particularly the case when there is a comparatively high wall load in the lamp because in highly loaded lamps the detrimental influence of the very short-wave ultraviolet radiation (185 nm) generated in the mercury discharge plays a major part. A comparatively strong degradation of the luminescent layer may also occur during life of the known lamp.

SUMMARY OF THE INVENTION

The invention has for its object inter alia to provide a low-pressure mercury discharge lamp whose radiated light is white and whose colour rendering is very good, while at the same time the luminous efficacy of the low-pressure mercury discharge lamp is comparatively high and decreases to a comparatively small extent during the operating life of the low-pressure mercury discharge lamp.

According to the invention, a low-pressure mercury discharge lamp as described in the opening paragraph is for this purpose characterized in that the luminescent layer in addition comprises a third luminescent material with a band emission whose maximum lies between 430 nm and 490 nm, a fourth luminescent material with emission mainly between 520 nm and 565 nm, and a fifth luminescent material with emission mainly between 590 nm and 630 nm.

It has been found that a lamp according to the invention has favourable properties as regards the colour point of the light radiated by the lamp, the luminous efficacy and the degradation of the luminescent layer both at high and at low loads. The colour rendering of a lamp according to the invention is also very good.

The calcium halophosphate activated by antimony and manganese which is used in the known low-pressure mercury lamp exhibits an emission over the entire visible range of the spectrum during lamp operation. It is especially this property which renders this halophosphate suitable for use in the luminescent layer of a lamp having a very good colour rendering. In a lamp according to the invention, however, a mixture is used of three luminescent materials which each exhibit emission mainly in a comparatively small portion of the visible spectrum. It is very surprising that also low-pressure mercury discharge lamps whose luminescent layer has been subject to such a drastic change of the emission spectrum, as compared with the luminescent layer of the known lamp with a very good colour rendering, have a very good colour rendering as well.

It should be noted that the use of a mixture of three luminescent materials, each emitting mainly in a comparatively small portion of the visible spectrum, in the luminescent layer of a lamp is known per se, for example, from U.S. Pat. No. 4,176,294 and Netherlands Patent 164,697. The luminescent layers of the low-pressure mercury discharge lamps described therein, however, often comprise only three luminescent materials, so that the colour rendering of such low-pressure mercury discharge lamps cannot be designated as very good.

As in the known low-pressure mercury discharge lamps, very favourable results are obtained in the lamps according to the invention when the first luminescent material comprises one or several substances from the group formed by strontium aluminate activated by bivalent europium, barium aluminate activated by bivalent europium, and strontium borophosphate activated by bivalent europium. The said strontium aluminate activated by bivalent europium (further referred to as SAE) is a luminescent material known per se defined by the formula $Sr_{(1-p)}Eu_pAl_qO_{(1½q+1)}$, in which up to 25 mole % of the Sr may be replaced by Ca and in which $0.001 \leq p \leq 0.10$ and $2 \leq q \leq 5$. The luminescent aluminates SAE, which are described in more detail in NL-A-8201943, have an emission band with a maximum at 485–495 nm and a half-value width of 55 to 75 nm. The said barium aluminate activated by bivalent europium (called BAE hereinafter) is a luminescent material known per se defined by the formula $Ba_{(1-p)}Eu_pAl_qO_{(1½q+1)}$, in which up to 25 mole % of the Ba may be replaced by Sr, and in which $0.005 \leq p \leq 0.25$ and $5 \leq q \leq 10$. The luminescent materials BAE, which are described more fully in NL-A 8105739, have an emission band with a maximum at 475– 485 nm and a half-value width of 70–90 nm. The said strontium borophosphate activated by bivalent europium (called SBP hereinafter) is a luminescent material known per se defined by the formula $m(Sr_{(1-x-y-p)}Ba_xCa_yEu_p)O.(1-n)(P_2O_5).n(B_2O_3)$, in which $0 \leq x \leq 0.5$, $0 \leq y \leq 0.2$, $0.001 < p \leq 0.15$, $1.75 \leq m \leq 2.30$ and $0.05 \leq n \leq 0.23$. The luminescent materials SBP arc described in DE-A 2848726 and have an emission band with a maximum at 470–485 nm and a half-value width of 80–90 nm.

It was also found that lamps according to the invention with good properties are obtained when the second luminescent material, as also in known lamps, comprises a pentaborate activated by trivalent cerium and by bivalent manganese, which pentaborate has a red $Mn^{2+}$ emission. These pentaborates, to be referred to hereinafter as CBM, are luminescent materials which are known per se (see NL-A 7905680 and NL-A 8100346) defined by the formula $(Y,La,Gd)_{(1-x)}Ce_x(Mg,Zn,Cd)_{(1-p)}Mn_pB_5O_{10}$, in which up to 20 mole % of the B may be replaced by Al and/or Ga, and in which $0.01 \leq x \leq 1.0$ and $0.01 \leq p \leq 0.30$. The pentaborates comprising Gd and Mg are preferred here. These borates show a very efficient emission resulting from $Mn^{2+}$ upon excitation by the short-wave ultraviolet radiation of a low-pressure mercury discharge in a comparatively narrow band with a maximum at approximately 630 nm and a half-value width of approximately 80 nm.

Low-pressure mercury discharge lamps according to the invention are preferred which are characterized in that the third luminescent material composes one or several substances from the group formed by barium-magnesium aluminate activated by bivalent europium and strontium chlorophosphate activated by bivalent europium. The said barium-magnesium aluminates activated by bivalent europium, called BAM for short hereinafter, are luminescent materials known per se and having a hexagonal crystal structure related to the structure of β-alumina (see NL-A 7214862). These aluminates, which can be represented by the formula $Ba_{(1-p)}Eu_p.xMgO.yAl_2O_3$, in which up to 25 mole % of the $Al_2O_3$ may be replaced by $Ga_2O_3$ and/or $Sc_2O_3$, and in which $1 \leq x \leq 2$, $5 \leq y \leq 8$ and $0.01 \leq p \leq 0.50$, are highly efficient and show band emission with a maximum at approximately 450 nm and a half-value width of approximately 50 nm. The said strontium chlorophosphate activated by bivalent europium (called SCAP hereinafter) is a known luminescent material (for example, see U.S. Pat. No. 4,038,204) with the crystal structure of the mineral apatite and with a composition of the basic lattice which in general deviates a little from the stoichiometric formula $M_{10}(PO_4)_6X_2$ (M is an alkaline earth, mainly Sr; X is a halogen, mainly chlorine). SCAP has an efficient band emission (maximum at approximately 450 nm, half-value width approximately 85 nm).

Suitable substances to be used in the fourth luminescent material are cerium-magnesium aluminate activated by trivalent terbium and cerium-magnesium pentaborate activated by trivalent cerium and trivalent terbium. The said cerium-magnesium aluminate activated by trivalent terbium (called CAT hereinafter) is known per se from NL-A 72 14862 and has a hexagonal crystal structure related to that of magnetoplumbite. The aluminates CAT are defined by the formula $(Ce_{(1-p-q)}La_pTb_q)_2O_3.xMgO.yAl_2O_3$, in which up to 25 mole % of the $Al_2O_3$ may be replaced by $Ga_2O_3$ and/or $Sc_2O_3$, and in which $2 \leq x \leq 4$, $10 \leq y \leq 16$, $0 \leq p \leq 0.50$, $0.01 \leq q \leq 0.60$ and $p+q \leq 0.90$. The said pentaborate activated by trivalent cerium and trivalent terbium (called CBT hereinafter) is known from the cited NL-A 7905680 and NL-A 8100346 and can be represented with the formula $(Y,La,Gd)_{(1-x-y)}Ce_xTb_y(Mg,Zn,Cd)B_5O_{10}$, in which up to 20 mole % of the B may be replaced by Al and/or Ga and in which $0.01 \leq x \leq 1-y$ and $0.01 \leq y \leq 0.75$. Pentaborates comprising Gd and Mg are preferred here. The luminescent materials CAT and CBT yield a very efficient line emission mainly in the 520–565 nm range.

It is also possible to form the fourth luminescent material from the pentaborate activated by trivalent cerium and by bivalent manganese mentioned above as a possibility for the second luminescent material in that this pentaborate is also activated by trivalent terbium, so that the second luminescent material forms at least part of the fourth luminescent material. It is advantageous when the function of the fourth luminescent material is entirely fulfilled by the second luminescent material because in that case the luminescent layer comprises one luminescent component less, which simplifies lamp manufacture. The pentaborates activated by trivalent cerium as well as by bivalent manganese and by trivalent terbium, referred to as CBTM hereinafter, are known from the cited NL-A 7905680 and NL-A 8100346 and may be represented with the formula $(Y,La,Gd)_{(1-x-y)}Ce_xTb_y(Mg,Zn,Cd)_{(1-p)}Mn_pB_5O_{10}$, in which up to 20 mole % of the B may be replaced by Al and/or Ga, and in which $0.01 \leq x \leq 1-y$, $0.01 \leq y \leq 0.75$ and $0.01 \leq p \leq 0.30$. The pentaborates comprising Gd and Mg are again preferred.

A suitable material for forming the fifth luminescent material is yttrium oxide activated by trivalent europium. This luminescent oxide known per se (called YOX hereinafter) is defined by the formula $Y_{(2-p)}Eu_pO_3$, in which $0.01 \leq p \leq 0.20$, and shows a very efficient line emission mainly in the 590–630 nm range.

If it is desired that the light radiated by the low-pressure mercury lamp has a comparatively low colour temperature, this can be achieved in that the luminescent layer comprises a luminescent yttrium-aluminium garnet activated by trivalent cerium. This aluminate (called YAG hereinafter) is defined by the formula $Y_{3-x}Ce_xAl_5O_{12}$, in which $0.01 \leq x \leq 0.15$. Substitutions of other rare earths such as Gd, La and Lu for Y are possible here, and also part of the Al may be replaced by, for example, Ga and/or Sc. These luminescent garnets (for example, see Appl. Phys. Letters, 11.53, 1967) absorb not only short-wave ultraviolet radiation but also visible deep-blue radiation and emit in a wide band (half-value width approximately 110 nm) with a maximum at approximately 560 nm.

BRIEF DESCRIPTION OF THE DRAWINGS

The sole FIGURE shows a low-pressure mercury vapor discharge lamp according the invention.

DESCRIPTION OF THE PREFERRED EMBODIMENTS

Figure 1:
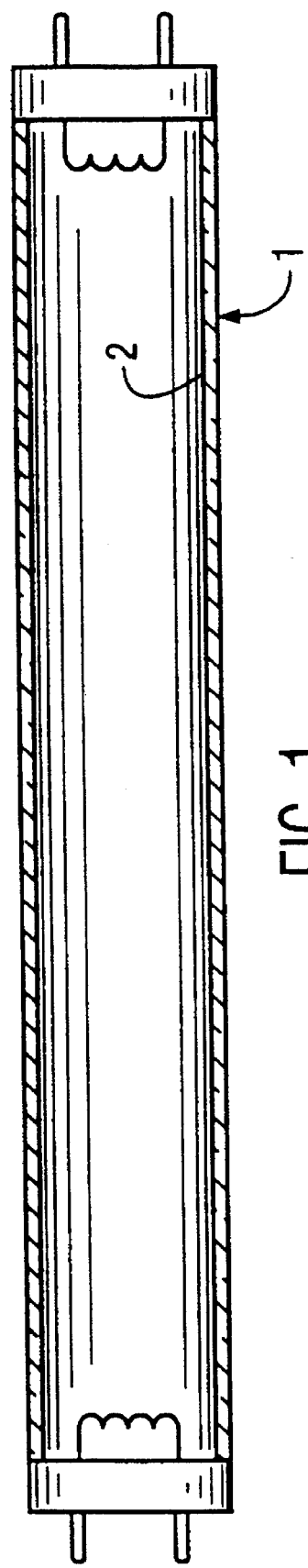

The lamp has a gas-tight radiation transmitting envelope 1 and a filling of mercury and a rare gas therein. The inner surface has a luminescent layer 2.

The invention will be explained in more detail with reference to four Tables. All results shown in Tables I, II and III relate to a tubular low-pressure mercury discharge lamp (tube length≈120 cm; tube diameter≈2.5 cm; gas filling= krypton and argon) of the TLD type with a power rating of 36 W. Table I shows the colour temperature Tc of the light radiated by the lamp, the colour rendering index Ra and the luminous efficacy after one hundred hours of operation, $\eta 100$ in 1 m/W, for five different compositions of the luminescent layer of a lamp according to the invention. The first through fifth luminescent materials are indicated with Roman numerals I to V in Tables I, II and III. The first luminescent material used is strontium aluminate activated by bivalent europium (SAE). The second and also fourth luminescent material used is a pentaborate comprising gadolinium and magnesium activated by trivalent cerium, trivalent terbium and bivalent manganese (CBTM). The third luminescent material is barium-magnesium aluminate activated by bivalent europium (BAM). The fifth luminescent material is yttrium oxide activated by trivalent europium (YOX). Two of the five compositions also contain yttrium-aluminium garnet activated by trivalent cerium (YAG). The compositions are given in percents by weight. The coordinates of the colour point of the relevant CBTM in a low-pressure mercury discharge lamp of the TLD type with a power rating of 36 W are also indicated below the percentage by weight of CBTM for each composition of the luminescent layer. This colour point can be adjusted over a comparatively wide range by means of the quantifies of terbium and manganese present in the CBTM. It is apparent that low-pressure mercury discharge lamps with a very good colour rendering (Ra≧90) according to the invention can be manufactured over a very wide colour temperature range of the light radiated by the low-pressure mercury lamp and with a comparatively high luminous efficacy.

Table II shows, as does Table I, the colour temperature Tc of the light radiated by the discharge lamp, the colour rendering index Ra and the luminous efficacy $\eta 100$ in 1 m/W for five different compositions of the luminescent layer of a lamp according to the invention. In the compositions shown in Table II, however, the first luminescent material used was barium aluminate activated by bivalent europium (BAE). It is evident that the luminous efficacy $\eta 100$ and the colour rendering index in dependence on the colour temperature Tc correspond strongly to those found for the compositions of the luminescent layer shown in Table I.

Table III shows the colour rendering index Ra and the luminous efficacy $\eta 100$ of low-pressure mercury discharge lamps according to the invention for two values of the colour temperature Tc for compositions of the luminescent layer which differ from the compositions shown in Table I in that one of the luminescent materials is replaced by an alternative luminescent material. In the first and the second row of Table III, SAE as the first luminescent material is replaced by strontium borophosphate activated by bivalent europium (SBP). In the third and the fourth row, CBTM is replaced as the fourth luminescent material by cerium-magnesium aluminate activated by trivalent terbium (CAT). This means that the pentaborate present in the layer as the second luminescent material is not activated by terbium but exclusively by manganese and cerium (CBM). So CBTM is replaced by a mixture of CAT and CBM. In the fifth and the sixth column, BAM is replaced as the fifth luminescent material by strontium chlorophosphate activated by bivalent europium (SCAP). Table III illustrates that the luminescent layers of low-pressure mercury discharge lamps according to the invention can be formed from widely differing luminescent materials.

Table IV shows the colour temperature Tc, the luminous efficacy after one hundred hours of operation $\eta 100$, the colour rendering index Ra and the degradation of the luminescent layer during lamp life expressed as the quotient ($\eta 2000/\eta 100$) of the luminous efficacy of the lamp after 2000 hours ($\eta 2000$) and the luminous efficacy of a lamp after 100 hours ($\eta 100$) for low-pressure mercurcy discharge lamps of two types. A number of these lamps was of the TLD type, a tubular low-pressure mercurcy discharge lamp (tube length≈120 cm; tube diameter≈2.5 cm; gas filling=krypton and argon) with a power rating of 36 W. The wall load of the lamp is approximately 380 W/m$^2$ during lamp operation, i.e. the lamp has a comparatively low wall load. In addition, lamps of the PL-L type were used, also low-pressure mercurcy discharge lamps, having the same power rating and a gas filling consisting of argon. Lamps of the PL-L type have a discharge vessel formed by two parallel tubular parts which are interconnected by a bridge. The internal diameter of the tubular parts is approximately 1.5 cm and the total length of the discharge column during lamp operation is approximately 106 cm. The wall load is approximately 720 W/m$^2$ during operation. Lamps having a wall load of more than 500 W/m$^2$ are often regarded as highly loaded, so that the lamp of the PL-L type used here is an example of a highly loaded lamp. The first row in Table IV relates to a lamp according to the invention and of the TLD type whose luminescent layer is so composed that the colour temperature of the light radiated by the lamp is approximately 4000° K. The second row of the Table also relates to a lamp of the TLD type according to the invention. The composition of the luminescent layer of this lamp, however, is such that the colour temperature of the light radiated by the lamp is approximately 5200° K. The third and the fourth row of the Table also relate to lamps of the TLD type, but not according to the invention since the luminescent layers of these lamps comprise calcium halophosphates. The compositions of the luminescent layers of this third and fourth lamp are so chosen that the colour temperatures of the light radiated by the lamps are 4000° K. and 5200° K., respectively. The remaining four rows of the Table relate to lamps of the PL-L type. The lamps of the fifth and sixth row are according to the invention. The luminescent layers of the lamps of the seventh and eighth row, however, comprise calcium halophosphate. The colour temperature of the light radiated by the lamps of the fifth and the seventh row of the Table is approximately 4000° K. The colour temperature of the light radiated by the lamps of the sixth and the eighth row of the Table is approximately 5200° K. It can be seen that lamps of both types and according to the invention have considerably higher luminous efficacies than the corresponding lamps in which the luminescent layer comprises calcium halophosphate. It is also evident that, especially for (highly loaded) lamps of the PL-L type, the lamps according to the invention show a much smaller degradation of the luminescent layer than the lamps whose luminescent layers comprise calcium halophosphate. The luminous efficacies of lamps of the PL-L type with a luminescent layer comprising calcium halophosphate are very low. This combination of a very low luminous efficacy and a fast degradation of the luminescent layer render it very unattractive, if not impossible, to manufacture highly loaded lamps with a very good colour rendering and comprising a luminescent layer with calcium halophosphate. It is evident from the data in Table IV, however, that highly loaded lamps according to the invention have a high luminous efficacy and a comparatively small degradation.

TABLE I

| Tc (°K.) | R (a, 8) | η (lm/W) | I SAE % by weight | II + IV CBTM % by weight | III BAM % by weight | V YOX % by weight | YAG % by weight |
|---|---|---|---|---|---|---|---|
| 2700 | 90 | 64.6 | 1.9 | 41.1 (455,407) | 9.8 | 30.2 | 17 |
| 3000 | 90 | 63.2 | 1.0 | 50.1 (451/440) | 8.6 | 24.3 | 16 |
| 3800 | 90.8 | 82.1 | 12.5 | 43.8 (386/475) | 5.1 | 38.6 | — |
| 5000 | 92 | 82.7 | 19.3 | 33.4 (373/488) | 9.1 | 38.2 | — |
| 6500 | 92.7 | 79.1 | 9.8 | 34.0 (346/514) | 17.4 | 38.8 | — |

TABLE II

| Tc (°K.) | R (a, 8) | η (lm/W) | I BAE % by weight | II + IV CBTM % by weight | III BAM % by weight | V YOX % by weight | YAG % by weight |
|---|---|---|---|---|---|---|---|
| 2700 | 90 | 66.1 | 3.9 | 37.4 (451/410) | 7.4 | 35.3 | 16 |
| 3000 | 90 | 64.8 | 2.9 | 40.5 (443/418) | 10.2 | 31.4 | 15 |
| 3800 | 90 | 81.1 | 7.3 | 44.8 (381/480) | 1.8 | 46.1 | — |
| 5000 | 92.2 | 82.4 | 13.9 | 38.4 (358/503) | 3.9 | 43.8 | — |
| 6500 | 93.2 | 80.7 | 16.8 | 33.2 (342/518) | 9.4 | 40.6 | — |

TABLE III

| Tc (°K.) | R (a, 8) | η100 (lm/W) | I SBP % by weight | II + IV CBTM % by weight | III BAM % by weight | V YOX % by weight |
|---|---|---|---|---|---|---|
| 5000 | 92.9 | 81.1 | 17.4 | 37.6 (373/487) | 6.8 | 38.2 |
| 6500 | 93.9 | 79.6 | 14.8 | 36.5 (358/502) | 10.7 | 38.0 |

| Tc (°K.) | R (a, 8) | η100 (lm/W) | I SAE % by weight | II CBM % by weight | III BAM % by weight | IV CAT % by weight | V YOX % by weight |
|---|---|---|---|---|---|---|---|
| 5000 | 90.6 | 80.1 | 10.9 | 3.0 | 12.8 | 18.2 | 55.1 |
| 6500 | 91.5 | 77.5 | 12.1 | 1.8 | 19.8 | 16.4 | 49.9 |

| Tc (°K.) | R (a, 8) | η100 (lm/W) | I SAE % by weight | II + IV CBTM % by weight | III SCAP % by weight | V YOX % by weight |
|---|---|---|---|---|---|---|
| 5000 | 92.0 | 76.6 | 5.6 | 34.2 (362/499) | 7.8 | 52.4 |
| 6500 | 93.0 | 72.3 | 7.1 | 26.3 (354/506) | 12.8 | 53.8 |

TABLE IV

| Lamp type | Tc (°K.) | η100 (lm/W) | R (a, 8) | η2000/η100 % |
|---|---|---|---|---|
| TLD-36W | 4000 | 82 | 91 | 90 |
| TLD-36W | 5200 | 82 | 92 | 90 |
| TLD-36W* | 4000 | 66 | 93 | 90 |
| TLD-36W* | 5200 | 63 | 95 | 90 |
| PL-L-36W | 4000 | 69 | 91 | 90 |
| PL-L-36W | 5200 | 69 | 92 | 90 |
| PL-L-36W* | 4000 | 51 | 93 | 80 |
| PL-L-36W* | 5200 | 53 | 95 | 80 |

*: not according to the invention, for comparison.

We claim:

1. A low-pressure mercury discharge lamp with a very good colour rendering and with a colour point $(x_L, y_L)$ on or close to the Planckian locus, said lamp comprising a gastight, radiation-transmitting envelope which contains mercury and rare gas, and having a luminescent layer comprising a first luminescent material activated by bivalent europium and having an emission band whose maximum lies between 470 nm and 500 nm and whose half-value width is at most 90 nm, a second luminescent material activated by bivalent manganese and having at least an emission band mainly in the red region of the visible spectrum, a third luminescent material with a band emission whose maximum lies between 430 nm and 490 nm, a fourth luminescent material with emission mainly between 520 nm and 565 nm, and a fifth luminescent material with emission mainly between 590 nm and 630 nm.

2. A low-pressure mercury discharge lamp as claimed in claim 1, in which the first luminescent material comprises at least one substance selected from the group consisting of strontium aluminate activated by bivalent europium, barium aluminate activated by bivalent europium, and strontium borophosphate activated by bivalent europium.

3. A low-pressure mercurcy discharge lamp as claimed in claim 2, in which the second luminescent material comprises a pentaborate activated by trivalent cerium and by bivalent manganese, which pentaborate has a red $Mn^{2+}$ emission.

4. A low-pressure mercury discharge lamp as claimed in claim 3, characterized in that the third luminescent material comprises at least one substance selected from the group consisting of barium-magnesium aluminate activated by bivalent europium and strontium chlorophosphate activated by bivalent europium.

5. A low-pressure mercury discharge lamp as claimed in claim 4, characterized in that the third luminescent material comprises at least one substance selected from the group consisting of barium-magnesium aluminate activated by bivalent europium and strontium chlorophosphate activated by bivalent europium.

6. A low-pressure mercurcy discharge lamp as claimed in claim 5, characterized in that the fifth luminescent material comprises yttrium oxide activated by trivalent europium.

7. A low-pressure mercurcy discharge lamp as claimed in claim 3, characterized in that the pentaborate is further activated by trivalent terbium and forms at least a part of the fourth luminescent material.

8. A low-pressure mercurcy discharge lamp as claimed in claim 7, characterized in that the luminescent layer further comprises yttrium-aluminium garnet activated by trivalent cerium.

9. A low-pressure mercury discharge lamp as claimed in claim 1, in which the second luminescent material comprises a pentaborate activated by trivalent cerium and by bivalent manganese, which pentaborate has a red $Mn^{2+}$ emission.

10. A low-pressure mercury discharge lamp as claimed in claim 9, characterized in that the third luminescent material comprises at least one substance selected from the group consisting of barium-magnesium aluminate activated by bivalent europium and strontium chlorophosphate activated by bivalent europium.

11. A low-pressure mercury discharge lamp as claimed in claim 10, characterized in that the fourth luminescent material comprises at least one substance selected from the group consisting of cerium-magnesium aluminate activated by trivalent terbium and pentaborate activated by trivalent cerium and by trivalent terbium.

12. A low-pressure mercury discharge lamp as claimed in claim 11, characterized in that the fifth luminescent material comprises yttrium oxide activated by trivalent europium.

13. A low-pressure mercury discharge lamp as claimed in claim 12, characterized in that the luminescent layer further comprises yttrium-aluminium garnet activated by trivalent cerium.

14. A low-pressure mercury discharge lamp as claimed in claim 9, characterized in that the pentaborate is further activated by trivalent terbium and forms at least a part of the fourth luminescent material.

15. A low-pressure mercury discharge lamp as claimed in claim 14, characterized in that the luminescent layer further comprises yttrium-aluminium garnet activated by trivalent cerium.

16. A low-pressure mercury discharge lamp as claimed in claim 2, characterized in that the third luminescent material comprises at least one substance selected from the group consisting of barium-magnesium aluminate activated by bivalent europium and strontium chlorophosphate activated by bivalent europium.

17. A low-pressure mercury discharge lamp as claimed in claim 1, characterized in that the third luminescent material comprises at least one substance selected from the group consisting of barium-magnesium aluminate activated by bivalent europium and strontium chlorophosphate activated by bivalent europium.

18. A low-pressure mercury discharge lamp as claimed in claim 2, characterized in that the fifth luminescent material comprises yttrium oxide activated by trivalent europium.

19. A low-pressure mercury discharge lamp as claimed in claim 1, characterized in that the fifth luminescent material comprises yttrium oxide activated by trivalent europium.

20. A low-pressure mercury discharge lamp as claimed in claim 2, characterized in that the luminescent layer further comprises yttrium-aluminium garnet activated by trivalent cerium.

21. A low-pressure mercury discharge lamp as claimed in claim 1, characterized in that the luminescent layer further comprises yttrium-aluminium garnet activated by trivalent cerium.

* * * * *